US011822596B2

United States Patent
Zotto

(10) Patent No.: US 11,822,596 B2
(45) Date of Patent: Nov. 21, 2023

(54) DIGITAL IMAGE FILE METADATA CHARACTERISTICS

(71) Applicant: Hewlett-Packard Development Company, L.P., Spring, TX (US)

(72) Inventor: Rafael Dal Zotto, Porto Alegre (BR)

(73) Assignee: Hewlett-Packard Development Company, L.P., Spring, TX (US)

(*) Notice: Subject to any disclaimer, the term of this patent is extended or adjusted under 35 U.S.C. 154(b) by 363 days.

(21) Appl. No.: 17/246,548

(22) Filed: Apr. 30, 2021

(65) Prior Publication Data
US 2022/0350837 A1 Nov. 3, 2022

(51) Int. Cl.
*G06F 16/583* (2019.01)
*G06F 16/58* (2019.01)
*G06V 40/16* (2022.01)

(52) U.S. Cl.
CPC ........ *G06F 16/583* (2019.01); *G06F 16/5866* (2019.01); *G06V 40/172* (2022.01); *G06V 40/179* (2022.01)

(58) Field of Classification Search
CPC . G06F 16/583; G06F 16/5866; G06V 40/172; G06V 40/179; G06V 40/173; G06V 20/30
See application file for complete search history.

(56) References Cited

U.S. PATENT DOCUMENTS

| | | | |
|---|---|---|---|
| 2011/0211764 A1* | 9/2011 | Krupka | G06V 20/30 382/225 |
| 2011/0317928 A1* | 12/2011 | Yabu | G06F 16/583 382/225 |
| 2012/0250950 A1* | 10/2012 | Papakipos | G06F 16/583 382/118 |
| 2013/0259327 A1* | 10/2013 | Cheswick | G06V 20/30 382/118 |
| 2015/0227782 A1* | 8/2015 | Salvador | G06V 40/172 382/118 |
| 2016/0034459 A1* | 2/2016 | Larsen | G06F 16/487 707/740 |

* cited by examiner

*Primary Examiner* — Edward F Urban
*Assistant Examiner* — Wassim Mahrouka
(74) *Attorney, Agent, or Firm* — Quarles & Brady LLP

(57) ABSTRACT

In an example implementation according to aspects of the present disclosure, a system, method, and storage medium for processing digital image file metadata characteristics. The system includes a processor and memory. The processor executes machine readable instructions to receive a set of digital image files from a first client application. The processor extracts a set of metadata from the set of digital image files. The processor identifies a set of common characteristics within the set of metadata. The processor groups the set of digital image files based on the set of common characteristics. The processor evaluates an association between the set of common characteristics and a second user. Responsive to the evaluation, the processor sends the grouped set of digital image files to a second client application.

14 Claims, 4 Drawing Sheets

DIGITAL IMAGE FILE METADATA CHARACTERISTICS

BACKGROUND

Digital image files often incorporate common elements taken by different people at common social events. Often digital image files are taken on a mobile device, such as a mobile phone, and stored in a client application.

DETAILED DESCRIPTION

During social events, such as family vacations, friends, reunions or work gatherings, hundreds of digital image files may be generated. During a family vacation, for example, parents can take turn while each one uses their own mobile devices (e.g. camera enabled smartphones) to take pictures. At the end of the day, each camera (or phone) has a unique collection of great pictures, capturing the moment they were in, and taken from different angles.

The automatic detection of such social events from a large photo collection, requires a high semantic understanding in the interpretation of the photos characteristics, along with different additional metadata information such as timestamps, detected faces, and global positioning system (GPS) coordinates.

As described herein includes a system, method and computer readable medium for processing large digital image file collections and create an event grouping, based on different photo characteristics and additional metadata. As described herein, different digital image files, taken from different mobile devices, may be processed and grouped, offering a social event cluster that can then be shared among the different participants.

In an example, a system may be communicatively coupled to a plurality of mobile devices. The mobile devices may incorporate a digital image file client application. The digital image file client application may establish a network connection to the system. The system may receive a set of digital image files from the plurality of mobile devices. The system may extract a set of metadata from the set of digital image files. The system may identify a set of common characteristics within the set of metadata. The system may group the set of digital image files based on the set of common characteristics. The system may evaluate an association between the set of common characteristics a second user and send the grouped set to the associated client application of the second user.

Figure 1:
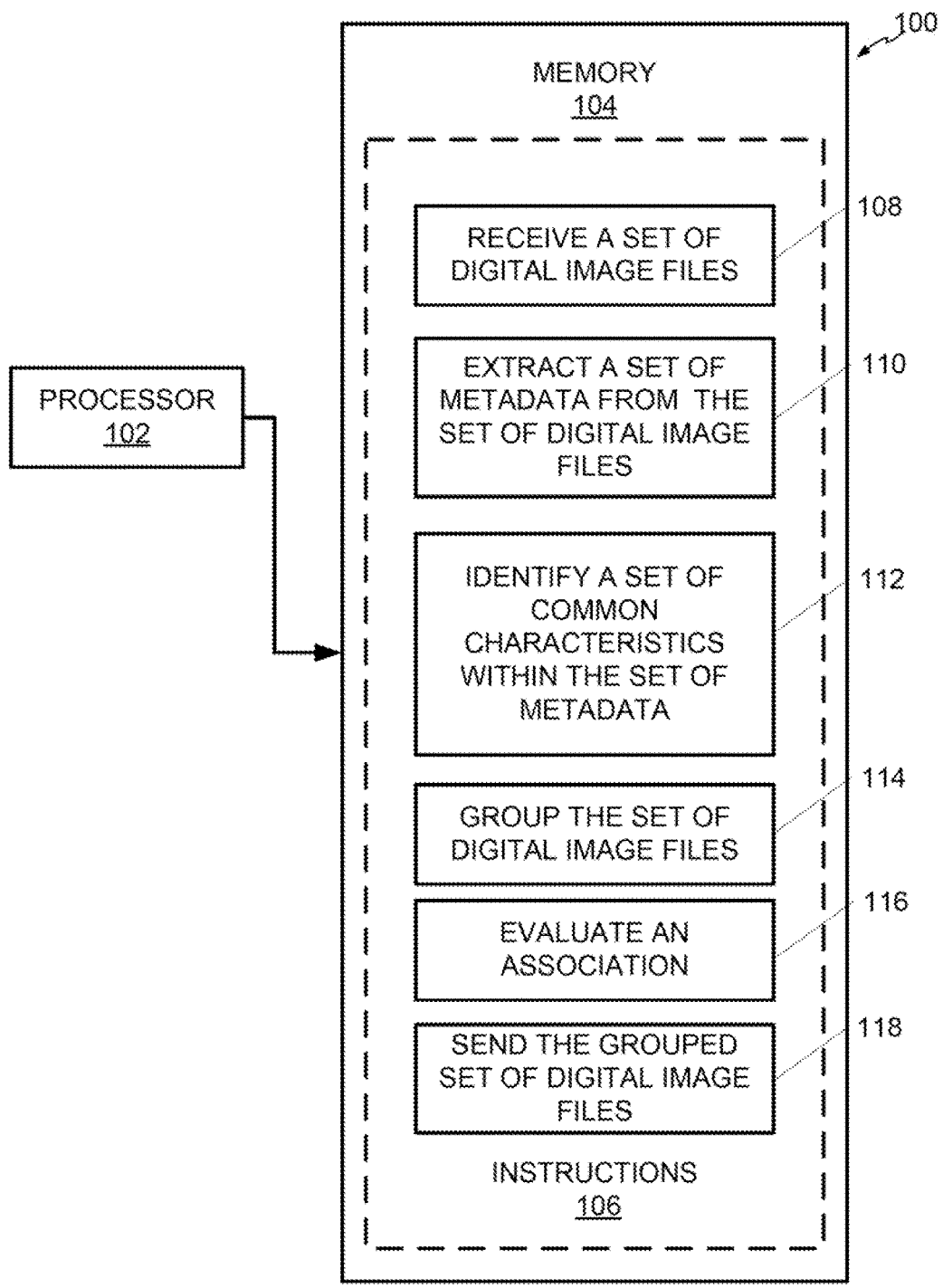
FIG. 1 is a block diagram of a system for creating digital image file metadata characteristics, according to an example.

FIG. 1 is a block diagram of a system 100 for creating digital image file metadata characteristics, according to an example. The processor 102 of the device 100 may be implemented as dedicated hardware circuitry or a virtualized logical processor. The dedicated hardware circuitry may be implemented as a central processing unit (CPU). A dedicated hardware CPU may be implemented as a single to many-core general purpose processor. A dedicated hardware CPU may also be implemented as a multi-chip solution, where more than one CPU are linked through a bus and schedule processing tasks across the more than one CPU.

A virtualized logical processor may be implemented across a distributed computing environment. A virtualized logical processor may not have a dedicated piece of hardware supporting it. Instead, the virtualized logical processor may have a pool of resources supporting the task for which it was provisioned. In this implementation, the virtualized logical processor may be executed on hardware circuitry; however, the hardware circuitry is not dedicated. The hardware circuitry may be in a shared environment where utilization is time sliced. In some implementations the virtualized logical processor includes a software layer between any executing application and the hardware circuitry to handle any abstraction which also monitors and save the application state. Virtual machines (VMs) may be implementations of virtualized logical processors.

A memory 104 may be implemented in the device 100. The memory 104 may be dedicated hardware circuitry to host instructions for the processor 102 to execute. In another implementation, the memory 104 may be virtualized logical memory. Analogous to the processor 102, dedicated hardware circuitry may be implemented with dynamic random-access memory (DRAM) or other hardware implementations for storing processor instructions. Additionally, the virtualized logical memory may be implemented in a software abstraction which allows the instructions 106 to be executed on a virtualized logical processor, independent of any dedicated hardware implementation.

The device 100 may also include instructions 106. The instructions 106 may be implemented in a platform specific language that the processor 102 may decode and execute. The instructions 106 may be stored in the memory 104 during execution. The processor 102 may receive a set of digital image files from a first client application associated with a first user 108. In one implementation, the processor 102 may be associated with a cloud-based service. The processor 102 may receive a set of digital image file from a first client application executing on a first mobile device. For example, a photo application on a mobile device may be connected to the cloud-based service via an internet connection, interconnected over WiFi or cellular data network. The photo application may upload the set of digital image files as a batch, or individually as each digital image file is created within the first client application. The cloud-based service may store the set of digital image files locally in cloud-based storage for processing.

The processor 102 may extract a set of metadata from the set of digital image files, wherein the set of metadata comprises metadata of each of the set of digital image files 110. The set of metadata corresponds to all of the metadata of the set of digital image files. Metadata may include exchangeable image file format (EXIF) data stored internally to the digital image files as well as global positioning system (GPS) data. In another example, the metadata may be stored externally to the set of digital image files as a database within the client application. The database may include metadata and a reference to the applicable digital image file to link the metadata to the corresponding digital image file. The metadata may include timestamps corresponding to when the digital image file was taken. The metadata may also include GPS coordinates indicating the location of the camera or mobile device at the time of the creation of the digital image file. In some implementations the GPS coordinates may be included in the EXIF data when the capturing mobile device or camera has the functionality to do so. Additionally, the EXIF data may include the exposure time (shutter speed), f-number (aperture), ISO setting, flash (on/off), and the timestamp. Some cameras or mobile devices may save additional EXIF data, such as the brightness value, white balance setting, metering mode, and sensing method. EXIF information may identify a device or client application the digital image file was created on.

In some implementations, the extraction of the set of metadata may include parsing a digital image file and separating any EXIF data from the image data embedded in the digital image file. Many processing methods to obtain the extract EXIF data are available in open source or commercial form.

The processor 102 may identify a set of common characteristics within the set of metadata wherein the set of common characteristics correspond to a common event 112. In one implementation, the set of common characteristics may include a similar time period. For example, if two digital image files are more than one day (24 hours) apart, their similarity is zero (0). Not considering Unix epoch representation, for and for the sake of visualization, equation 1 illustrates the calculation of similarity score S.

$$S = 1 - \frac{t_2 - t_1}{t_d} \qquad \text{Equation 1}$$

The processor 102 may user a predefined configuration to specify the event duration $t_d$ and $t_2$ and $t_1$ represent the timestamp of the most recent and earlier created digital image files respectively. In some implementations, the event duration may be considered to be shorter (e.g. three hours) or longer (one week). In this example, a common characteristic could be a similarity value that meets a threshold.

Another common characteristic may be a computed great circle distance (GCD). The GCD is the shortest distance between two points on the surface of a sphere, measured along the surface of the sphere. GCD is commonly used to determine the distance (in miles) between two GPS coordinates on the Earth's surface. If two digital image files were created more than d miles away from each other, it may be considered as having a similarity of zero (0). Otherwise the photo similarity score may be obtained by equation 2.

$$s = 1 - \frac{GCD}{d} \qquad \text{Equation 2}$$

The distance d may vary, based on system specifications. As one example, having d=1 may mean that photos taken 1 mile apart of each other may have no similarity.

Another common characteristic may include photo semantics. Semantics features of an image may be described as the contents of an image, according to human perception. By observing the semantics of a given photos, a human may identify the objects present in the image, along with concepts and situations related to the image. State of the art semantics libraries may be utilized to extract image semantics. OpenCV is an example of a library available to extract image semantics.

Another common characteristic may include face descriptors. Visual descriptors may be digital descriptions of the contents in images, photos and videos. Descriptors describe elementary characteristics of those assets, such as shape, color, texture or motion. Face descriptors may be the collection of visual features that can be used to describe the characteristics of a human's face. In this example, the face descriptor may be unique. The face descriptor is devoid of identifying characteristics to match the face to a person's identity. A correlation between the face descriptor may be made from the client application received, but no identifying information of the human face is used. State of the art software libraries such as OpenCV may be utilized to generate face descriptors from source images.

The processor 102 may group the set of digital image files based on at least the set of common characteristics 114. In one implementation, the processor 102 may create a knowledge base. A knowledge base may be used to store structured and unstructured data. For each of the set of digital image files, an aggregated knowledge base may hold in formation about the moment when the photo was taken, detect individuals (through face descriptors), approximate a location where the photo was taken, as well as other sematic information obtained from the digital image file.

The processor 102 may utilize Equation 2 to determine a proximity similarity score. Digital image files with higher proximity similarity scores may have a higher likelihood of occurring at the same social even. The knowledge base may group digital image files based on their proximity score in relation to one another. The processor 102 may also group digital image files based on their time similarity score. In addition to the proximity similarity scoring, a high valued time similarity score (see Equation 1) enhances the confidence that a digital image file occurred at the same social event. The processor 102 may utilize any image semantics to group or duster digital image files. Image semantic extraction may involve identifying visual elements within the digital image files. The detection of common visual elements within the digital image, especially with high proximity and time similarity scores, may increase confidence in a social event grouping. For example, two digital image files may differ in time similarity score and proximity similarity score, where the similarity scores are not high, but also not zero. In this instance, semantics or common visual elements may indicate a similar social event. For example, replicas of banners indicating an event may be present in digital image files of different times and places, where the similarity scores are not zero. The commonality of these visual elements may be included in the knowledge graph. Based on the proximity similarity score and the time similarity score, the processor 102 may group the digital image files corresponding to similar faces by comparing face descriptors. By comparing face descriptors, the processor 102 may create in the knowledge base a learned relationship between people appearing in digital image files during a period of time and location.

In one example, digital image files may only incorporate non-human elements, thereby lacking face descriptors for grouping. In this example, common visual elements may be used to determine the grouping. For example, landscape photos may include certain landscape elements like a specific structure. Semantic image processing may detect this feature across the set of digital file images. These images may be grouped together in the knowledge base based on the common visual elements. As such, the grouping also groups the client applications from which they were received and may be used to send the set of grouped digital image files to the linked client applications.

The processor 102 may evaluate an association between the set of common characteristics and a second user 116.

Based on the face descriptors identified and stored within the knowledge base, an association between the common characteristics and the second user may be evaluated. A second user may exist as a user of a second client application. As digital image files may incorporate EXIF metadata indicative of the device or client application the digital image file was create, the processor 102 may link metadata comprising the set of common characteristics to the client application for which it was received. The processor 102 may identify a face descriptor in digital image files where the face descriptor is the singular face descriptor in the photo (e.g. "selfie" photo). The processor 102 may link that face descriptor to the client application from which it was received. Likewise, additional face descriptors may be used to identify client applications for which those of the set of the digital image files were received. The knowledge base may link digital image files between client application whereby their respective face descriptors are present within the associated image file.

The processor 102 may send, responsive to the evaluation, the grouped set of digital image files to a second client application associated with the second user 118. The common characteristics, such as proximity similarity score and time similarity score, as well as common image elements and face descriptors may create groups of the set of digital image files. Based on the face descriptors found in the groups, respective client applications may be identified via linkage in the knowledge base corresponding to the solo (e.g. selfie) face descriptors and the client applications from which they were received. The processor 102 may push all of the grouped set of digital image files to client applications associated with the linked client application.

Figure 2:
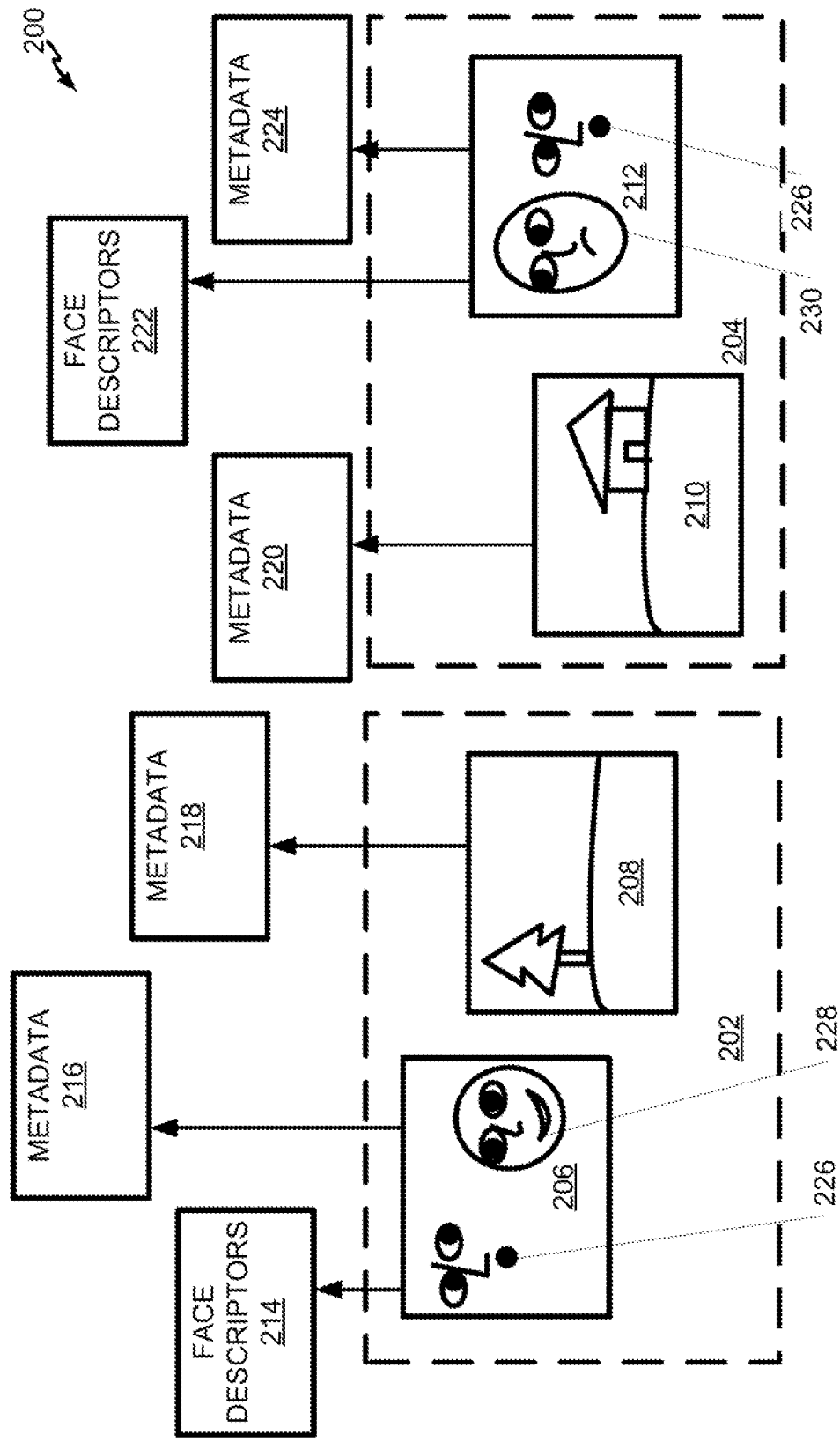
FIG. 2 is an illustration of digital image file metadata, according to an example.

FIG. 2 is an illustration of digital image file metadata, according to an example. In this illustration is a first client application 202 and a second client application 204. For this example, the first client application 202 and the second client application 204 may be executing on separate mobile devices or smartphones (not shown). Within the first client application 202 and the second client application 204 are a set of digital image files 206, 208, 210, 212. The set of digital image files include common characteristics that may be added to a knowledge base by extracting information from the images themselves, or the metadata associated with the images. Within the set of digital image files may exist human faces 226, 228, 230. Likewise, some of the set of digital image files 206, 208, 210, 212 may not contain human faces 226, 228, 230 (e.g. digital image files 208, 210).

The processor 102 of FIG. 1 may detect human faces 226, 228, 230. The processor 102 may extract a set of face descriptors 214, 222 corresponding to the human faces 226, 228, 230 detected within the set of digital image files 206, 208, 210, 212. The processor 102 may extract the metadata 216, 218, 220, 224 from their respective digital image files 206, 208, 210, 212. The metadata 216, 218, 220, 224 may include information included within the digital image files 206, 208, 210, 212, such as EXIF information. The processor 102 may identify common characteristics within the metadata 216, 218, 220, 224 including but not limited to the time similarity score, and proximity similarity score. The processor 102 may additionally identify common visual elements within the set of digital image files 206, 208, 210, 212. Face descriptors 214, 222 may be used to group the digital image files. In this example, the human face 228 may be determined to be a user associated with the first client application 202. The human face 226 may be determined to be a user associated with the second client application 202.

In this example, a group of digital image files including the digital image file 206 including the common face descriptors, may be sent to the second client application 204. Likewise, the grouping of face descriptors 214, 222 may be indicative of a social event, the digital image file with the human face 226 may be sent to the first client application 204 even though, the associated human face 228 does not appear in the digital image file 212. A third user of a third client application (not shown) associated to the human face 230 may also receive at the third client application, the digital image files 206, 212.

Figure 3:
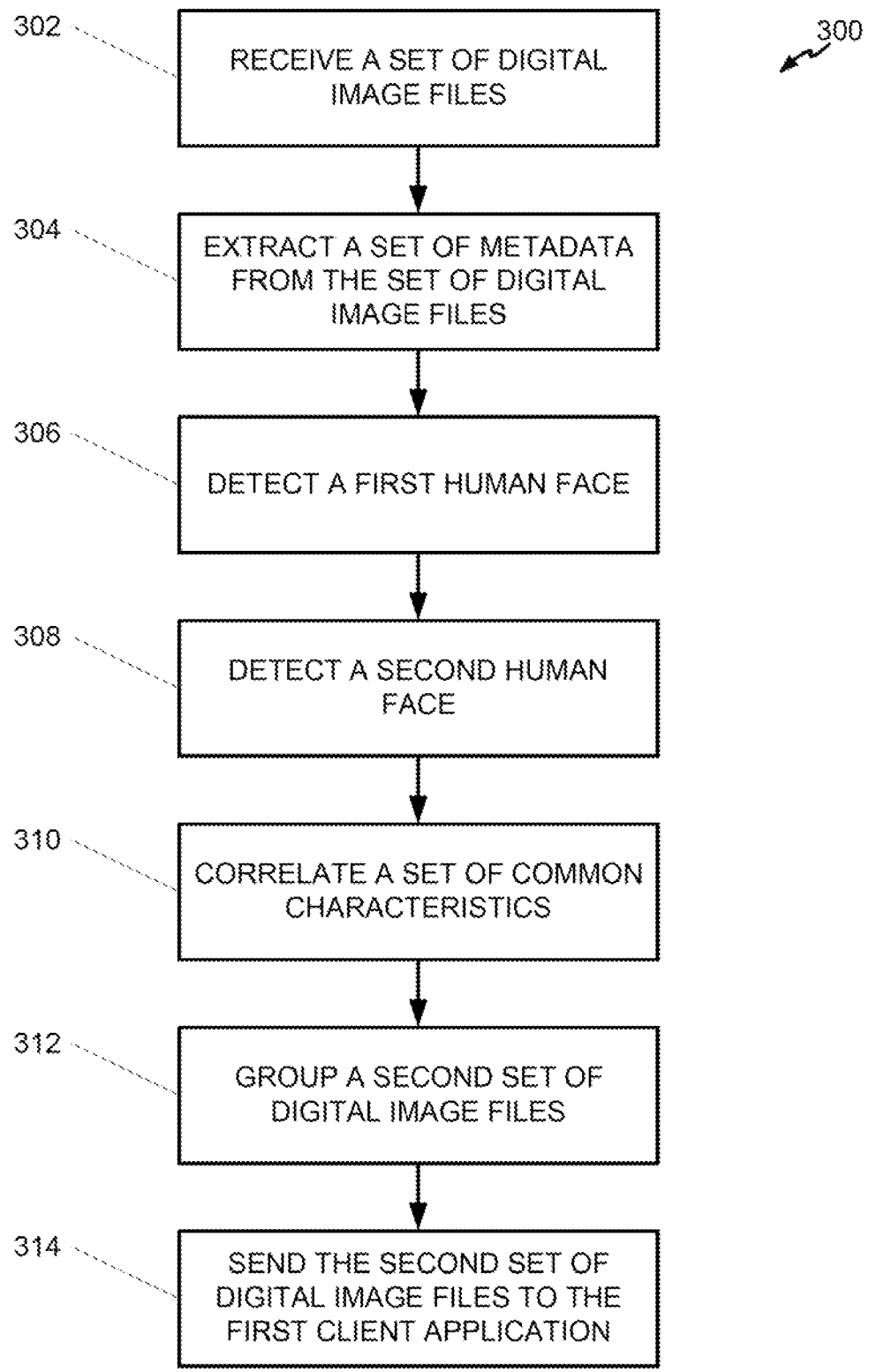
FIG. 3 illustrates a method for sending grouped digital image files based on metadata characteristics according to an example.

FIG. 3 illustrates a method for sending grouped digital image files based on metadata characteristics according to an example. The processor described in respect to FIG. 3 may be the processor 102 of FIG. 1.

At block 302, the processor 102 receives a set of digital image files from a first client application and a second client application. As described previously, the first client application and the second client application may sync with the processor 102. The processor 102 may receive the set of digital image files from two or more client applications.

At block 304, the processor 102 extracts a set of metadata from the set of digital image files, wherein the set of metadata comprises metadata of each of the set of digital image files. The metadata may be extracted from the EXIF data of each of the set of digital image files. Additionally, a time similarity score and a proximity similarity score may be determined by the processor 102 and the extracted metadata for each of the digital image files within the set of digital image files. Additionally, a knowledge base may be utilized to create relationships between each of the set of digital image files so that each digital image file has data values corresponding to the other digital image files within the set.

At block 306, the processor 102 detects a first human face within a first digital image file within set of digital image files. The processor 102 may create a first face descriptor identifying a first human face within a first digital image file. As the processor 102 iterates across the set of digital image files, the processor may detect the first human face by first face descriptor in more than one digital image file.

At block 308, the processor 102 detects a second human face within a second digital image file within the set of digital image files, wherein the second human face is different from the first human face. The processor 102 creates a face descriptor for a second human face that is different than the first human face. The processor 102 compares the first face descriptor to the second face descriptor. In one implementation, the comparison may be an overloaded equal operator written to compare all data fields within the structure of the descriptor.

At block 310, the processor 102 correlates a set of common characteristics between a first metadata from the first digital image file and a second metadata from the second digital image file. The processor 102 uses the knowledge base to correlate relationships between the extracted metadata from the set of digital images. For example, the correlation may include the comparison of time similarity scores and proximity similarity scores to thresholds indicative of a social event.

At block 312, the processor 102 groups a second set of digital image files from the set of digital image files based on the set of common characteristics, the first human face, and the second human face. Based on the correlation of the common characteristics the processor 102, may identify first and second face descriptors that occur in one or more of the set of digital image files. The processor then groups the digital image files that meet those criteria in a second set of digital image files that have commonality.

At block 314, the processor 102 sends the second set of digital image files to the first client application associated with a user associated with the first human face, and the second client application associated with a user associated with the second human face. The second set of digital image files meets the criteria of the common characteristics as well as the common first and second face descriptors. As such, the processor 102 may send the second set of digital images to the first client application and second client application as the second set of digital images corresponds with a social event.

Figure 4:
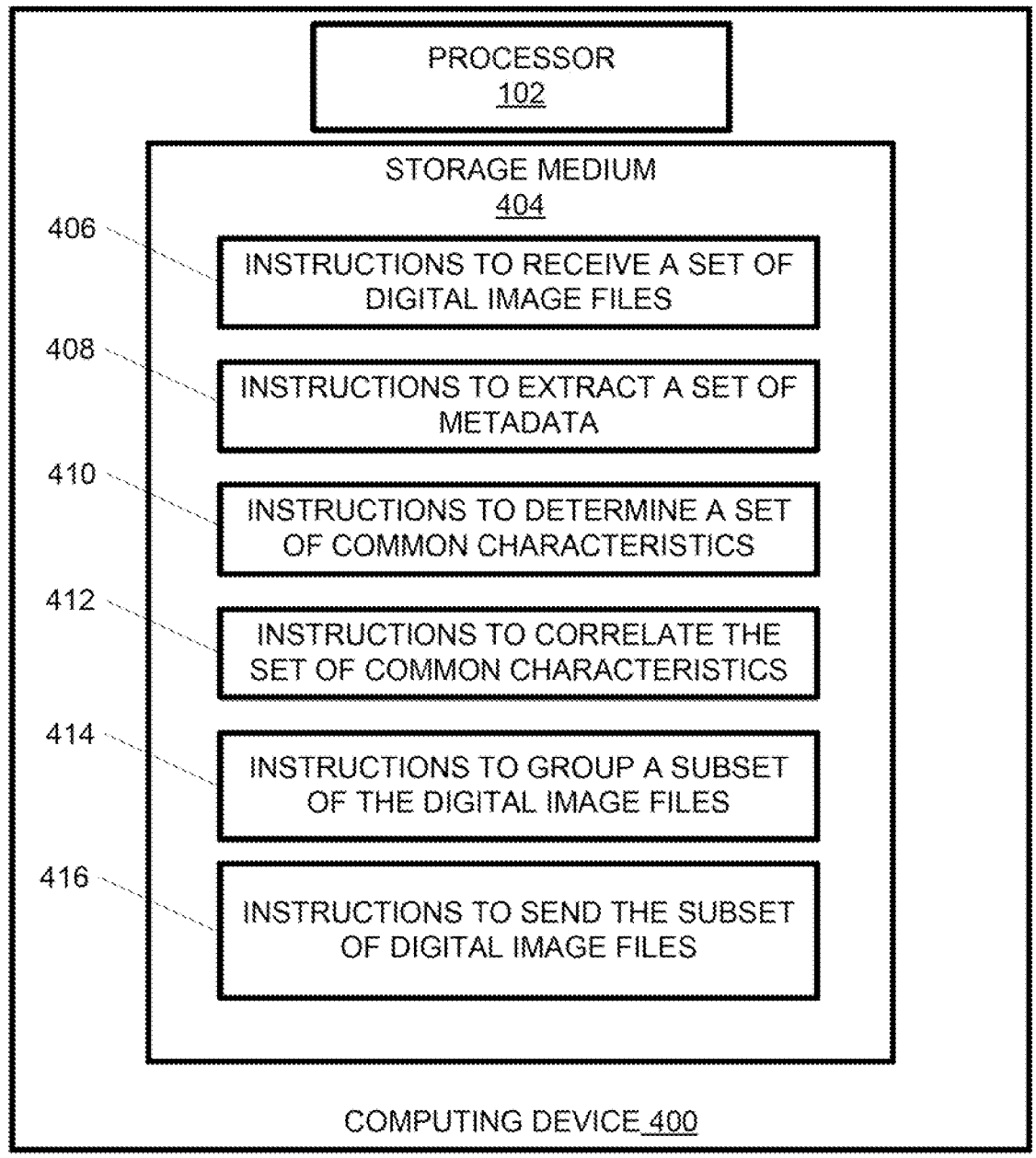
FIG. 4 is a computing device for supporting instructions for digital image file metadata characteristics, according to an example.

FIG. 4 is a computing device 400 for supporting instructions for digital image file metadata characteristics system, according to an example. The computing device 400 depicts a processor 102 and a storage medium 404 and, as an example of the computing device 400 performing its operations, the storage medium 404 may include instructions 406-416 that are executable by the processor 102. The processor 102 may be synonymous with the processor 102 referenced in FIG. 1. Additionally, the processor 102 may include but is not limited to central processing units (CPUs). The storage medium 404 can be said to store program instructions that, when executed by processor 102, implement the components of the computing device 400.

The executable program instructions stored in the storage medium 404 include, as an example, instructions to receive a set of digital image files from a plurality of client applications 406, instructions to extract a set of metadata from each of the set of digital image files, wherein each of the set of metadata identifies a client application from which the corresponding digital image file was captured 408, instructions to determine a set of common characteristics from the set of metadata 410, instructions to correlate the set of common characteristics to a social event 412, instructions to group a subset of the digital image files selected based on the correlated social event 414, and instructions to send the subset of the digital image files to each client application identified with the metadata of the subset of the digital image files 416.

Storage medium 404 represents generally any number of memory components capable of storing instructions that can be executed by processor 102. Storage medium 404 is non-transitory in the sense that it does not encompass a transitory signal but instead is made up of at least one memory component configured to store the relevant instructions. As a result, the storage medium 404 may be a non-transitory computer-readable storage medium. Storage medium 404 may be implemented in a single device or distributed across devices. Likewise, processor 102 represents any number of processors capable of executing instructions stored by storage medium 404. Processor 102 may be integrated in a single device or distributed across devices. Further, storage medium 404 may be fully or partially integrated in the same device as processor 102, or it may be separate but accessible to that computing device 400 and the processor 102.

In one example, the program instructions 406-418 may be part of an installation package that, when installed, can be executed by processor 102 to implement the components of the computing device 400. In this case, storage medium 404 may be a portable medium such as a CD, DVD, or flash drive, or a memory maintained by a server from which the installation package can be downloaded and installed. In another example, the program instructions may be part of an application or applications already installed. Here, storage medium 404 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising:
a processor; and
a memory communicatively coupled to the processor and storing machine readable instructions that when executed cause the processor to:
receive a set of digital image files from a first client application associated with a first user, wherein each of the set of digital image files comprise a digital image and metadata associated with the digital image;
extract a set of metadata from the set of digital image files, wherein the set of metadata comprises metadata of each of the set of digital image files;
identify a set of common characteristics within the set of metadata wherein the set of common characteristics correspond to a common event;
group the set of digital image files based on at least the set of common characteristics;
evaluate an association between the set of common characteristics and a second user;
send, responsive to the evaluation, the grouped set of digital image files to a second client application associated with the second user;
detect, responsive to the receiving, a common visual element comprising a human face within the digital image of each of the set of digital image files, wherein the detection includes:
creating a face descriptor based on the human face within the digital image, and
comparing the face descriptor to a second face descriptor; and
group the set of digital image files based at least on the common visual element and on the comparing;
determine an association between the set of common characteristics and a third user; and send, responsive to the determination, the grouped set of digital image files based on at least the common visual element to a third client application associated with the third user.

2. The system of claim 1, wherein the face descriptor is unique and is devoid of identification information corresponding to the human face.

3. A method comprising:
receiving, by a processor, a set of digital image files from a first client application and a second client application;
extracting, by the processor, a set of metadata from the set of digital image files, wherein the set of metadata comprises metadata of each of the set of digital image files;
detecting, by the processor, a first human face within a first digital image file within set of digital image files;
detecting, by the processor, a second human face within a second digital image file within the set of digital image files, wherein the second human face is different from the first human face;
correlating, by the processor, a set of common characteristics between a first metadata from the first digital image file and a second metadata from the second digital image file;
grouping, by the processor, a second set of digital image files from the set of digital image files based on the set of common characteristics, the first human face, and the second human face; and
sending, responsive to the grouping, the second set of digital image files to the first client application associated with a user associated with the first human face, and the second client application associated with a user associated with the second human face.

4. The method of claim 3, wherein each of the set of digital image files comprise a digital image and metadata associated with the digital image.

5. The method of claim 3, wherein the first human face and the second human face are represented digitally as face descriptors.

6. The method of claim 5, wherein the face descriptors unique and are devoid of identification information corresponding to the first human face and the second human face.

7. A non-transitory computer readable medium comprising machine readable instructions that when executed cause a processor to:
receive a set of digital image files from a plurality of client applications;
extract a set of metadata from each of the set of digital image files, wherein each of the set of metadata identifies a client application from which the corresponding digital image file was captured;
determine a set of common characteristics from the set of metadata;
correlate the set of common characteristics to a social event;
group a subset of the digital image files selected based on the correlated social event;
send the subset of the digital image files to each client application identified with the metadata of the subset of the digital image files;
create a face descriptor based on a human face within at least one of the set of digital image files;
compare the face descriptor to a second face descriptor; and
group the at least one of the set of the digital image files with the subset based on at least on the comparing.

8. The medium of claim 7, wherein the face descriptor is unique and is devoid of identification information corresponding to the human face.

9. The medium of claim 8, wherein the subset of digital image files corresponds to the social event.

10. The medium of claim 7, wherein the set of common characteristics comprises time and date stamps.

11. The system of claim 1, wherein the face descriptor is a digital face descriptor including digital descriptors that describe visual features of the human face, are devoid of identification information corresponding to the human face, and are generated using a software library that generates face descriptors from source images.

12. The method of claim 3, wherein the metadata comprises exchangeable image file format (EXIF) data including one or more of global positioning coordinates, exposure time, f-number, ISO setting, flash setting, timestamp, brightness value, white balance setting, metering mode, or sensing method, and wherein extracting the set of metadata from the set of digital image files comprises:
parsing each digital image file of the set of digital image files, and
separating the EXIF data from image data embedded in each digital image file of the set of digital image files.

13. The method of claim 3, wherein the set of digital image files includes hundreds of digital image files.

14. The method of claim 3, further comprising:
detecting common visual elements in the second set of digital image files via semantic image processing using a semantics library,
wherein the grouping of the second set of digital image files is further based on the detected common visual elements.

* * * * *